United States Patent [19]

Basavanhally

[11] Patent Number: 5,611,014
[45] Date of Patent: Mar. 11, 1997

[54] OPTOELECTRONIC DEVICE CONNECTING TECHNIQUES

[75] Inventor: Nagesh R. Basavanhally, Hamilton Township, N.J.

[73] Assignee: Lucent Technologies Inc., Murray Hill, N.J.

[21] Appl. No.: 349,151

[22] Filed: Dec. 7, 1994

[51] Int. Cl.$^6$ .................................................. G02B 6/36
[52] U.S. Cl. ............................ 385/90; 385/49; 385/83
[58] Field of Search ................................ 385/14, 46, 49, 385/48, 50, 63, 65, 83, 90

[56] References Cited

U.S. PATENT DOCUMENTS

| 4,639,074 | 1/1987 | Murphy | 350/96.15 |
| 4,725,114 | 2/1988 | Murphy | 350/96.17 |
| 5,436,996 | 7/1995 | Tabasky et al. | 385/89 |

FOREIGN PATENT DOCUMENTS

| 0504882 | 9/1992 | European Pat. Off. | 385/49 |
| 2-125209 | 5/1990 | Japan | 385/49 |
| 4-340507 | 11/1992 | Japan | 385/49 |
| 6-13840 | 5/1994 | Japan | 385/49 |
| 6-167634 | 6/1994 | Japan | 385/49 |
| WO86/02172 | 4/1986 | WIPO | 385/65 |

OTHER PUBLICATIONS

Kaufmann, et al "Self–Adjusted ... Attachment of Fibres to GaAs Waveguide Components" Electr. Lttrs, pp 642–644 5 Jun. 86, vol. 22, No. 12.

*Primary Examiner*—John Ngo

[57] ABSTRACT

A waveguide mounting board having an array of ridge type waveguides on a surface thereof is automatically centered with an optical fiber board having a corresponding array of optical fibers by seating elongated alignment rails on the waveguide mounting board within alignment V-grooves in the fiber board. The alignment rails each comprises a short length of an optical fiber mounted on a pair of parallel alignment ridges. The alignment ridges are generally similar to the ridge type waveguides and are formed simultaneously therewith using a common photomask.

7 Claims, 2 Drawing Sheets

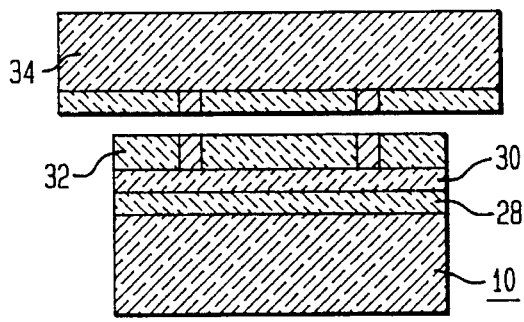
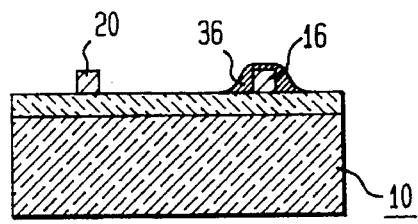
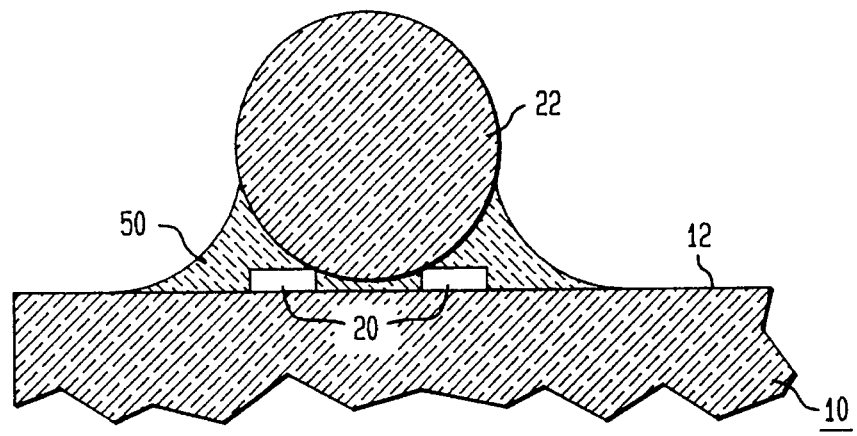
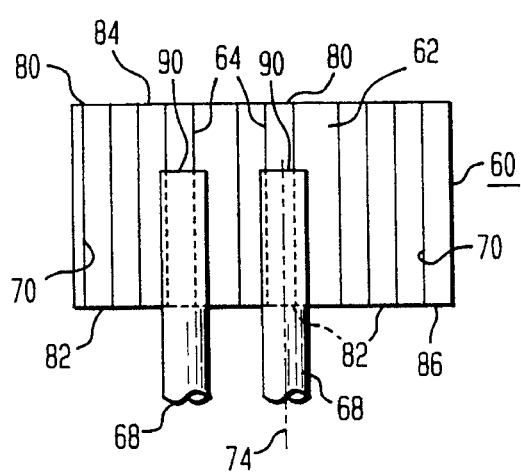
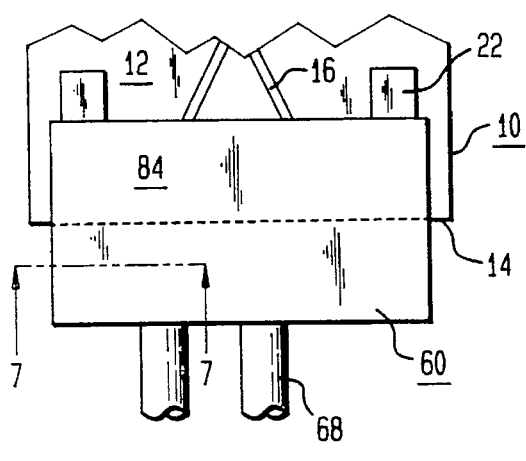

OPTOELECTRONIC DEVICE CONNECTING TECHNIQUES

BACKGROUND OF THE INVENTION

This invention relates to optoelectronic devices, and particularly to components and techniques for automatically, and "purely mechanically," interconnecting arrays of optical fibers with waveguide arrays.

The problem addressed by the present invention, as well as various solutions therefor, are known, see, for example, E. J. Murphy, "Fiber Attachment for Guided Wave Devices", J. Lightwave Tech., Vol. 6, No. 6, 6/88, pp. 862–871, and W. Hunziker et al, "Self-Aligned Optical Flip-Chip OEIC Packaging Technologies", Proc. ECOC, 1993, pp. 84–91 and U.S. Pat. Nos. 4,639,074 and 4,725,114, both to E. J. Murphy, the subject matter of which is incorporated herein by reference. Briefly, in various optical-electronic systems, e.g., telecommunication systems, it is the practice to mount various optical components, e.g., lasers, optical waveguide switch matrices, etc., on a mounting board and to interconnect the various components by means of optical waveguides formed on a surface of the mounting board. The waveguides are connected to optical fibers for signal transmission. Efficient assembly of the systems requires that the ends of the optical fibers be precisely aligned with and abutted against the ends of the waveguides. The present invention is directed to the problem of automatically interconnecting arrays of optical fibers with arrays of waveguides mounted on waveguide mounting boards. Also, as discussed in the cited references, the interconnecting is preferably done "purely mechanically," i.e., without the need for actually operating the devices being assembled together for monitoring and maximizing coupling efficiencies as part of the assembly process.

In one known technology, an array of fibers is disposed in a corresponding array of parallel V-grooves on a substrate which includes two empty V-grooves in precise relationship with the fibers. An array of waveguides, corresponding to the fiber array, is disposed on a second substrate which includes alignment ridges in precise relationship with the waveguides. In the assembly process, the two substrates are disposed in overlapping relationship with the ridges being disposed within the empty V-grooves for aligning the two substrates in contacting relationship. The ridges comprise elongated blocks having rectangular top surfaces, and precise alignment is obtained by engagement of elongated edges of the ridge top surfaces with the side walls of the V-grooves. End-to-end abutting relationship between the waveguides and the fibers is obtained by sliding the fiber substrate along the ridges until the ends of the fibers abut against ends of the waveguides.

While the prior known technology is functional, two problems are present. One problem arises from the fact that, in order to obtain precise alignment of the ridges with the waveguides on the waveguide substrate, the ridges are made using photolithographic and etching techniques involving etching into the surface of the substrate. While precision is obtained, the problem is that only relatively small ridges are obtained which are relatively fragile. During assembly, alignment of the two substrates is provided by sliding contact of the ridge upper surface edges with the sides of the V-grooves, and rupture of the edges frequently occurs.

Another problem of the process is that the ridges are formed separately from the waveguides, and the final accuracy is a function of how accurately the ridges are registered with the waveguides. Some inaccuracy inevitably results and, in any event, the separate processing procedures add expense.

SUMMARY OF THE INVENTION

Briefly, the present invention is similar to the above-described technology in that it uses a fiber mounting board including alignment grooves, and a waveguide board including alignment rails for engagement with the alignment grooves in the fiber board.

In accordance with one aspect of this invention, each alignment rail comprises a pair of parallel ridges and a short length of optical fiber secured between the pair of ridges. During assembly, the optical fiber length, preferably of substantially greater size and strength than the ridges, extends into an alignment groove in the fiber board for providing alignment between the two boards.

In accordance with a second aspect of this invention, the waveguides on the waveguide board also comprise ridges and are formed, simultaneously, with the alignment rail ridges in a known photolithographic and etching process sequence.

DESCRIPTION OF THE DRAWING

The drawings are schematic and not to scale.

FIGS. 2 and 3 are cross-sectional views illustrating the fabrication of the waveguide mounting board shown in FIG. 1;

FIG. 4 is a cross-sectional view of an alignment rail illustrating how it is secured to its underlying substrate;

FIG. 5 is a plan view of the optical fiber board shown in FIG. 1 but showing the undersurface thereof hidden from view in FIG. 1;

FIG. 6 is a plan view of the assembly shown in FIG. 1 in assembled together relationship.

DESCRIPTION OF PREFERRED EMBODIMENTS OF THE INVENTION

As previously indicated, the inventive technology is somewhat similar to that disclosed in the afore-cited Murphy and Hunziker et al articles and Murphy U.S. patents. In general, the invention makes use of known materials and processing techniques, and persons of skill will understand how to implement the invention as disclosed as well as how to use other technologies for such implementation.

The invention uses two basic components: an optic fiber mounting board and a waveguide board. Such components are generally known and can have various configurations depending upon the particular optoelectronic device involved. As shown in the Hunziker et al article, for example, the fiber mounting board (the "Si-Motherboard" in FIG. 1 of the article) includes not only V-grooves for receipt of the ends of optic fibers, but striplines for optical device interconnecting purposes. Also, the waveguide board in Hunziker et al (labeled "OEIC") includes beam leads for interconnecting various waveguides on the OEIC to respective striplines on the Motherboard. Any number of different configurations can be used, however, and, typically, various optoelectronic devices and components are mounted on the waveguide board and interconnected by means of waveguides on the board. As previously noted, the present invention is directed to interconnecting ends of waveguides on the waveguide board to ends of optical fibers on optic fiber mounting boards.

Figure 1:
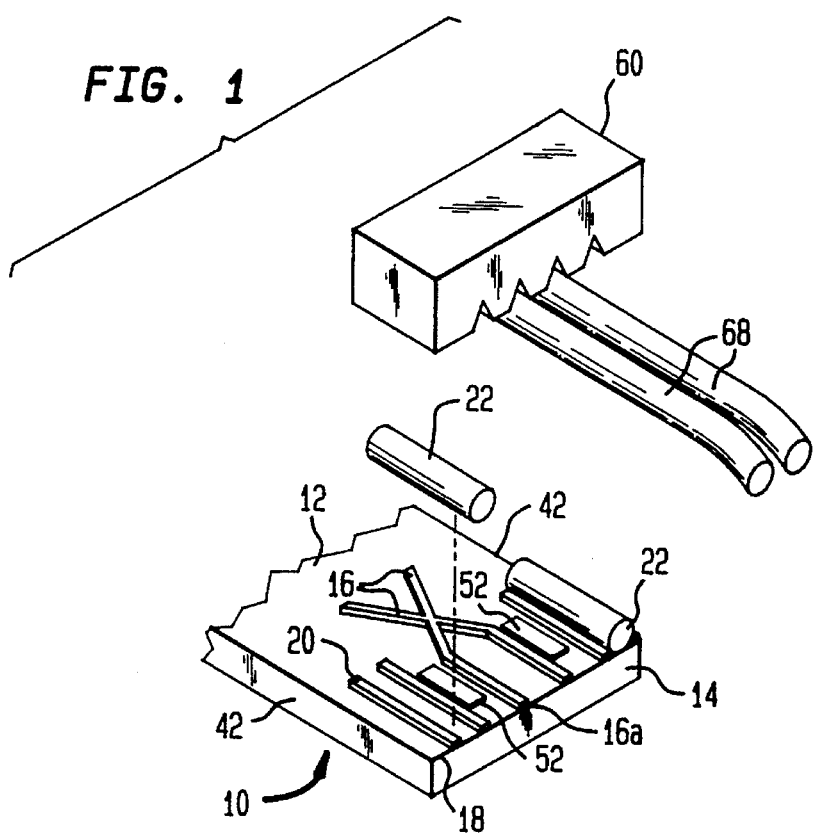
FIG. 1 is an exploded view, in perspective, of an optoelectronic assembly in accordance with this invention.

With reference to FIG. 1 herein, a portion of a waveguide board 10 is shown. The board 10 comprises a typical waveguide substrate of, e.g., silicon, fused quartz, a polymer, etc., having a top surface 12 and a front surface 14. (For convenience, terms such as "top", "front", etc. are used, but, obviously, the various device components can assume other orientations both during assembly and use.) Two waveguides 16 are disposed on the top surface 14 and extend to an edge 18 of the board at the front surface 12. Only two waveguides are shown although, typically, many more can be present. Also, while not illustrated, the rear ends of the waveguides (shown cut-off in FIG. 1) can extend to and be connected to various optoelectronic components mounted on the waveguide board 10.

Of significance, as described hereinafter, the waveguides 16 are preferably of the "ridge" type, i.e., comprising elongated ridges having upper surfaces spaced above the substrate top surface 12. Ridge type waveguides and methods of fabricating them are well known. They can be formed with great precision of dimensions and substrate placement using known photolithographic processes. In both the Murphy and Hunziker et al technologies, the waveguides disclosed are of the "buried" type, i.e., the upper surfaces thereof are flush or co-planar with the substrate top surface.

It is convenient to refer to the two waveguides 16 as "active" waveguides in that they serve as parts of transmission links for optical signals. In accordance with this invention, various pairs of side by side "dummy" waveguide ridges 20 are also provided on the substrate 10. The dummy waveguide ridges 20 do not transmit light, but serve as mechanical supports for optical fiber rails 22 mounted on each pair of dummy ridges 20.

A feature of the invention is that, while the dummy waveguide ridges 20 do not transmit light, the dummy ridges 20 are preferably substantially identical to and are formed simultaneously with the active waveguide ridges 16 in a known photolithographic process using a common photomask. As known, the use of a common photomask for simultaneously defining spaced apart elements provides a high degree of precision of the relative locations of the elements. As previously noted, both Murphy and Hunziker et al disclose buried waveguides in combination with alignment ridges, hence require separate processing sequences and the use of two separate photomasks for defining the buried waveguides and the waveguide board alignment ridges. Accordingly, the Murphy and Hunziker alignment arrangements are inherently less accurate than the herein described arrangement.

By way of example, for providing a pattern of active and dummy waveguides such as shown in FIG. 1, a substrate 10 (FIG. 2) of silicon is coated with a layer 28 of silicon dioxide coated with a layer 30 of optical glass coated with a layer 32 of photoresist. Using a photomask 34, a pattern including the active and dummy waveguides is reproduced in the form of non-developed portions of the photoresist layer 32 which, after removal, expose surface areas of the upper glass layer 30. The exposed portions of the glass layer 30 are etched away, e.g., by known reactive ion etching, and the photoresist layer removed, leaving a desired pattern (FIG. 3) of ridges 16 and 20. Then, the active waveguide ridges 16, but preferably not the dummy waveguides 20, are covered with an additional glass cladding layer 36 as typically used for obtaining desired light transmitting characteristics.

Other known processes for providing ridge (i.e., relief) type waveguides serving both as active and dummy waveguides can be used.

Figure 7:
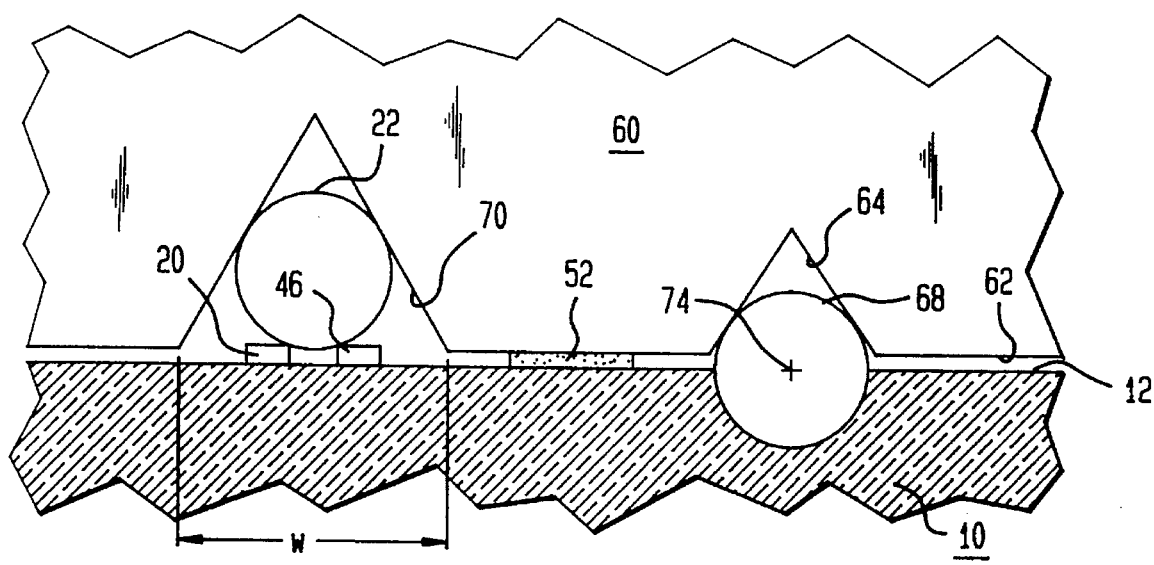
FIG. 7 is a cross-section, on an enlarged scale, taken along line 7—7 of FIG. 6.

The active waveguides 16 are designed in accordance with prior art practice for transmitting light and are as narrow as possible, e.g., having a width of 5 µm. Conversely, however, as shown in FIG. 7, the dummy waveguide ridges 20 preferably have a width somewhat greater, e.g., 20 µm, for providing the dummy ridges 20 with a mechanical strength greater than that required for the active ridges 16. The reason for such greater strength is described hereinafter. As known, differences in lateral dimensions (i.e., widths) of structural elements delineated by a common photomask do not affect the resulting precision. Conversely, errors can be introduced if the different elements have different thicknesses resulting from separate etching processes. For avoiding such errors, the thicknesses of all the ridges 16 and 20 are preferably identical, e.g., 5 µm, and all the ridges 16 and 20 are formed in the same etching process.

Each pair of dummy waveguide ridges serves, as previously noted, as a means for providing alignment of the two boards being assembled together. To this end, a short length, e.g., 7 mm of an optical fiber 22 is mounted on and between each pair of dummy ridges 20. As shown in FIG. 1, two pairs of dummy ridges 20 are provided on the substrate 10 adjacent to the sides 42 thereof. In the final assembly process, described hereinafter, the fiber board (yet to be described) is slid relative to the waveguide board 10 along the fiber lengths 22, hence the two fiber lengths are referred to as "rails", with each rail 22 being mounted on a pair of dummy ridges 20. As previously noted, the dummy waveguide ridges 20 are preferably wider than the active waveguide ridges 16 to provide greater strength for rigidly supporting the fiber rail and for withstanding the mechanical forces involved during the assembling together of the two boards.

An advantage of the use of optical fibers as alignment rails, in place of the alignment ridges used in Murphy and Hunziker et al, is that the optical fibers are relatively larger and stronger than etched alignment ridges, hence less subject to breakage. Also, while the optical fibers are formed separately from the alignment ridges, commercially available optical fibers are relatively inexpensive and are made with extremely precise diameters, e.g., with tolerances of ±1 µm for fiber diameters of 125 µm. Accordingly, highly precise alignments are obtainable.

The fiber rails 22 are precisely horizontally and vertically (but not axially) positioned by the dummy ridges 20 by mounting the circular fibers 22 in line contact with the inner edges 46 of the ridges, as shown in FIG. 7, and with the fibers 22 spaced slightly above the substrate surface 12 between the ridges 20. The fiber rails 22 are securely fastened to the substrate surface 12 by known means, e.g., an epoxy joint 50 as shown in FIG. 4. The joint 50 extends along a short length of the fiber rail and onto the substrate surface on opposite sides of the rail, i.e., on either side of the pair of ridges and not between the fiber and the ridges.

FIG. 1 also shows pads 52 of solder, e.g., 37% lead, 63% tin, on the substrate surface 12. The solder is used for firmly bonding together the waveguide and fiber boards. Other known bonding arrangements, e.g., epoxy, crimping and the like can be used.

Next described is the optical fiber mounting board 60 shown in FIGS. 1, 5, 6 and 7. Although, as is the case with the waveguide board 10, the fiber board 60 can have various configurations including various elements (e.g., beam leads such as shown in the Hunziker et al article), for purposes of the present invention, the fiber board 60 comprises (FIG. 5) simply a rectangular block having two arrays of V-grooves in a surface 62 of the block.

One array of grooves, referred to as "active grooves," comprises two side by side, parallel grooves 64 in center to center dimensional correspondence with the two waveguides 16 on the waveguide board 10. The purpose of the grooves 64 is to receive and accurately position two "active" optical fibers 68 for alignment and contact with the two waveguides 16. Obviously, more or less than two waveguides can be present on the waveguide board with different spacings between adjacent waveguides. In such case, an array of V-grooves 64 corresponding in number and dimensions to the waveguide array is used on the fiber board 60.

The other array of V-grooves on the fiber board 60 comprises two grooves 70, referred to as "alignment grooves", in dimensional alignment with the two rails 22 on the waveguide board 10. As shown (FIG. 7), the alignment V-grooves 70 are deeper and wider than the active grooves 64. The reason for this is explained hereinafter.

Both the dimensions and relative positioning of all the grooves 64 and 70 are critical for precise alignment of the fibers and waveguides. For obtaining high precision, the fiber board 60 is preferably made of monocrystalline silicon and the V-grooves are made in known manner using known photolithographic and anisotropic etching techniques. Conversely, depending upon the degree of precision required (which is a function of the device being made), fiber boards of other materials, provided with V-grooves by the other processes, e.g., plastic molding, stamping, can be used.

Two "active" optic fibers 68 (in the sense that they serve to transmit light) of known type are secured, e.g., with epoxy bonds similar to the ones previously described for the fiber lengths 22, within the two active grooves 64. The dimensions of the grooves 64 are such that (FIG. 7) slightly less than half the circumference of the fibers 68 is disposed within the grooves 64, with the central axis 74 of elongation of the fibers being spaced (e.g., 9.25 µm) above the surface 76 of the fiber board. The precisely dimensioned and positioned grooves 64 and 70, in cooperation with the precisely dimensioned (diameter) and shaped (circular) fibers result in the active fibers 68 being precisely positioned on the board 60 both vertically and horizontally within a given vertical plane.

All the grooves 64 and 70 extend (FIG. 5) the full length of the block 60 and have open ends 80 and 82 in the front surface 84 and the rear surface 86 of the block, respectively. The two active fibers 68 extend into the two grooves 64 through the open ends 86 thereof and the fibers terminate in end faces 90 spaced from the front, open ends 80 of the grooves 64. The fiber end faces 80 lie precisely in a common vertical plane, e.g., by pressing the fiber faces against a common surface of an aligning fixture (e.g., two parallel, cantilevered pins) disposed within the grooves 64 during assembly of the fibers on the block.

The fiber board 60 also includes two solder or solder wettable pads 52a positioned to overlie the solder pads 52 or the waveguide board 10 when the two boards 60 and 10 are assembled together, as now described.

As shown in FIGS. 1, 6 and 7, the two boards are disposed one above the other with the surface 76 of the fiber board 60 facing towards the surface 12 of the waveguide board 10 and with the front surface 84 of the fiber board 60 positioned rearwardly of the front surface 14 of the waveguide board 10. Typically, although not always, the waveguide board, including various optoelectronic components, is fixed in place, e.g., on a chassis, and the fiber board 60, attached to loosely strung fibers 68, is movable.

The fiber board 60 is then moved downwardly against the waveguide board 10 for inserting the fiber rails 22 into respective ones of the alignment grooves 70. As shown in FIG. 7, the surface width W of the alignment grooves 70 is significantly greater than the diameter of the fiber rails 22, hence relatively little precision is required in the inserting operation which can be readily performed manually or by machine.

One precaution during mounting of the two boards is that, when first engaged, the end faces 90 of the active fibers 68 within the fiber board grooves 64 are spaced axially apart from the front ends 16a of the active waveguides 16, such front ends 16a being co-planar with the front surface 14 of the waveguide board 10. Such relative spacing between the fiber ends 90 and the waveguide ends 16a is obtained, while still providing positive engagement of the alignment rails 22 within the alignment grooves 70, by the provision (FIG. 5) of the previously described relatively large space, e.g., 7 mm, between the fiber end faces 90 and the front surface 80 of the fiber block 60. Accordingly, by disposing the fiber rails 22 within the empty front length portions of the alignment grooves 70 and firmly seating the rails within the grooves and against the side walls thereof, the fiber board 60 is precisely horizontally and vertically centered with respect to the waveguide board 10.

As mentioned, the width W (FIG. 7) of the alignment grooves 70 in the fiber board is greater than the diameter of the fiber rails 22, and the result of this is that the rails 22 fit deeply within the grooves 70 with only a small circumferential portion of the fibers extending outwardly of the grooves. This relationship maintains the two facing surfaces 12 and 76 of the two boards 10 and 60, respectively, in spaced apart relationship (e.g., 11½ µm) and allows full seating of the rails 22 within the alignment grooves 70 as is necessary for proper centering of the two boards.

With the centering of the two boards 10 and 60, the two active fibers 68 in the fiber board 60 are axially aligned with the two active waveguides 16 on the waveguide board 10, but, as previously noted, the fiber ends 90 are axially spaced from the waveguide ends 16a. Then, the fiber board 60 is slid along the rails 22 rearwardly relative to the waveguide board until the end faces 90 of the active fibers 68 abut against the front ends 16a of the active waveguides 16. Because of the precision of location of the fiber end faces 90 and the waveguide front ends 16a in vertical planes perpendicular to the axes of elongation of the fibers and waveguides, excellent optical coupling relationships are provided between the active fibers and their respective waveguides.

When finally positioned together, the solder pads 52 on the waveguide board 10 are aligned with but spaced slightly below the solder or metal pads 52a on the fiber board 60. The two boards are then soldered together by heating the assembly, the solder present between the two boards expanding sufficiently to provide the necessary contacts at the solder joints.

What is claimed is:

1. An optoelectronic connector assembly comprising a first mounting board having first and second grooves formed in a first surface thereof, said grooves being in parallel, side by side relationship with one-another, said first groove containing an end of an optical fiber, a second mounting board containing a waveguide on a second surface thereof, said waveguide having an extending length portion, a rail mounted on and directly secured to said second surface and spaced from said waveguide, said rail comprising a length of an optical fiber having a circular cross-section and being disposed parallel to said extending length portion of said waveguide, and said first mounting board being mounted on said second mounting board and being, within a plane perpendicular to said first and second surfaces, laterally centered with respect to said second mounting board by means of said rail being seated within said second groove.

2. An assembly according to claim 1 wherein an end face of said optical fiber is in abutting, coaxial relationship with an end face of said waveguide.

3. An assembly according to claim 2 wherein said first and second grooves have open ends in a third surface of said first board perpendicular to said first surface thereof, and said end face of said optical fiber is spaced, within said first groove, from said third surface of said first board, said length portion of said waveguide on said second board extends to an edge formed between said second surface of said second board and a fourth surface of said second board perpendicular to said second surface, and said third surface of said first board overlies said second surface of said second board.

4. An assembly according to claim 1 wherein said waveguide is in the form of a ridge having a preselected height dimension relative to said second surface, said rail being fixedly mounted on and between a pair of parallel and spaced apart ridges disposed on said second surface and having a height relative to said second surface equal to that of said waveguide, said parallel ridges each including an upper edge, each said upper edge facing towards and extending parallel to the other said ridge, and said rail being mounted in line contact with both said rail edges and being spaced by said rails from said second surface.

5. An assembly according to claim 4 wherein said optical fiber rail has a diameter comparable to that of said optical fiber contained in said first groove.

6. An assembly according to claim 5 wherein the diameter of said optical fiber rail is substantially greater than the spacing between said ridges.

7. A method of centering, for connecting purposes, an array of waveguides on a waveguide mounting board with an array of optical fibers on a fiber mounting board, the method comprising the steps of mounting a length of an optical fiber on a surface of said waveguide mounting board, and seating said optical fiber length within an alignment groove in said fiber board, wherein said mounting step comprises fixedly mounting said optical fiber length on a pair of parallel and spaced apart edges at respective top surfaces of a pair of ridges on said surface of said waveguide mounting board, said pair of ridges having a spacing therebetween and a height for maintaining said optical fiber length spaced from said surface, and said seating step includes mounting said fiber mounting board on said waveguide mounting board.

* * * * *